May 28, 1946. S. S. ROBERTS 2,401,108
SEAL FOR SHAFTS
Filed May 29, 1942 2 Sheets-Sheet 1
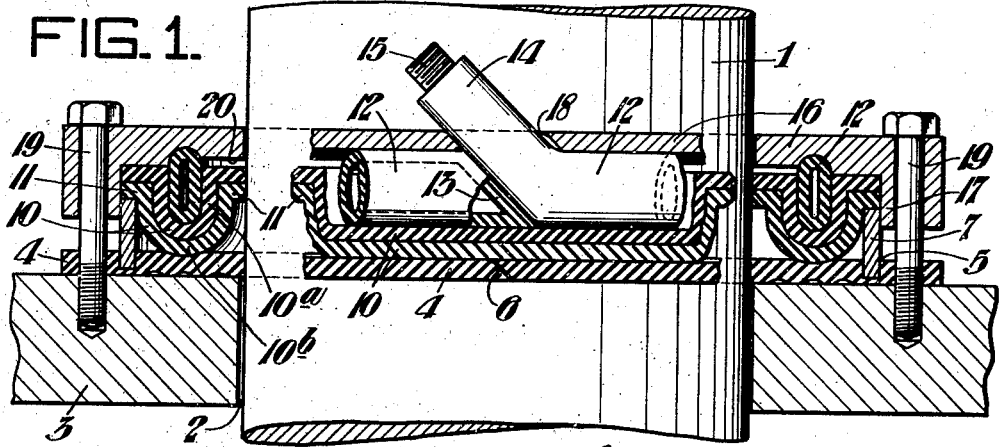
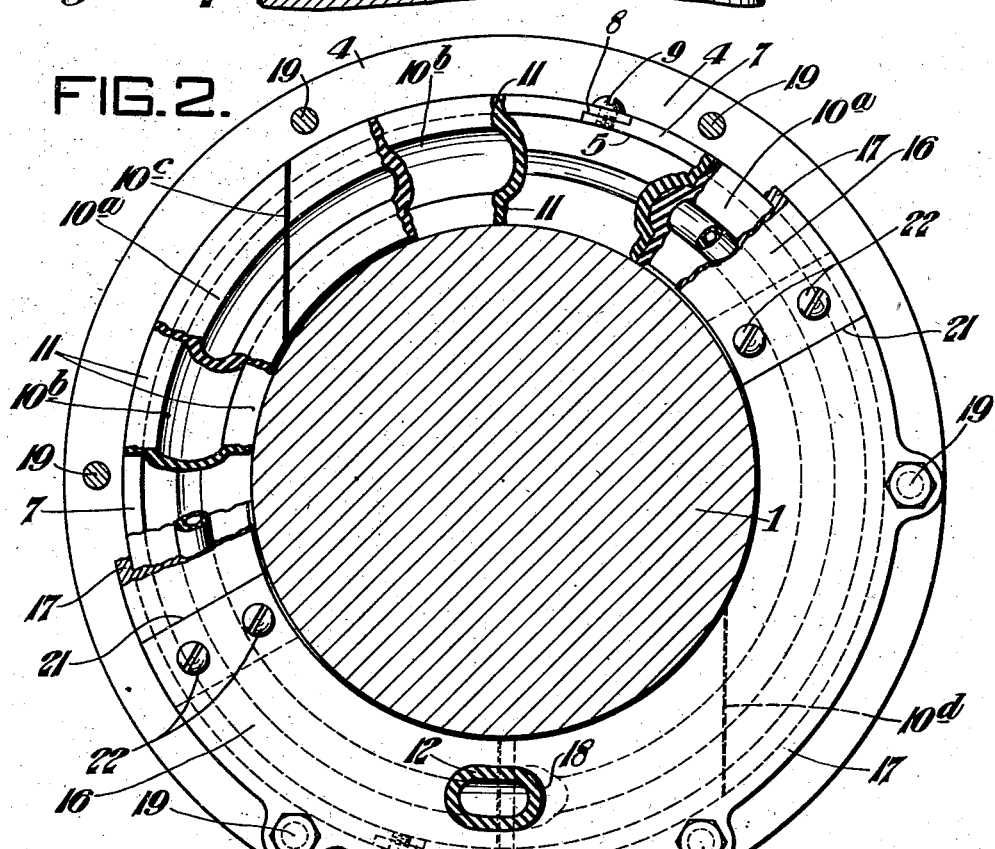
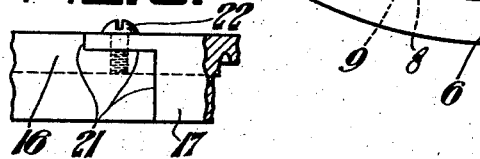
Inventor:
SAMUEL S. ROBERTS,
by John E. Jackson
his Attorney.

May 28, 1946.  S. S. ROBERTS  2,401,108
SEAL FOR SHAFTS
Filed May 29, 1942  2 Sheets-Sheet 2
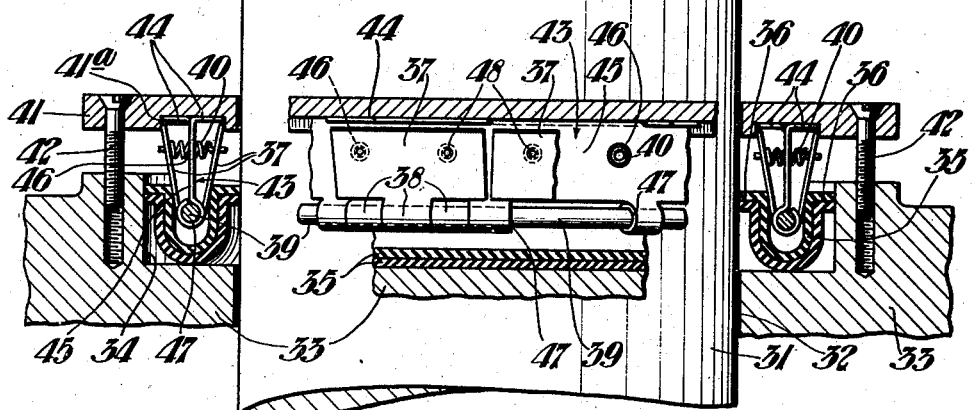
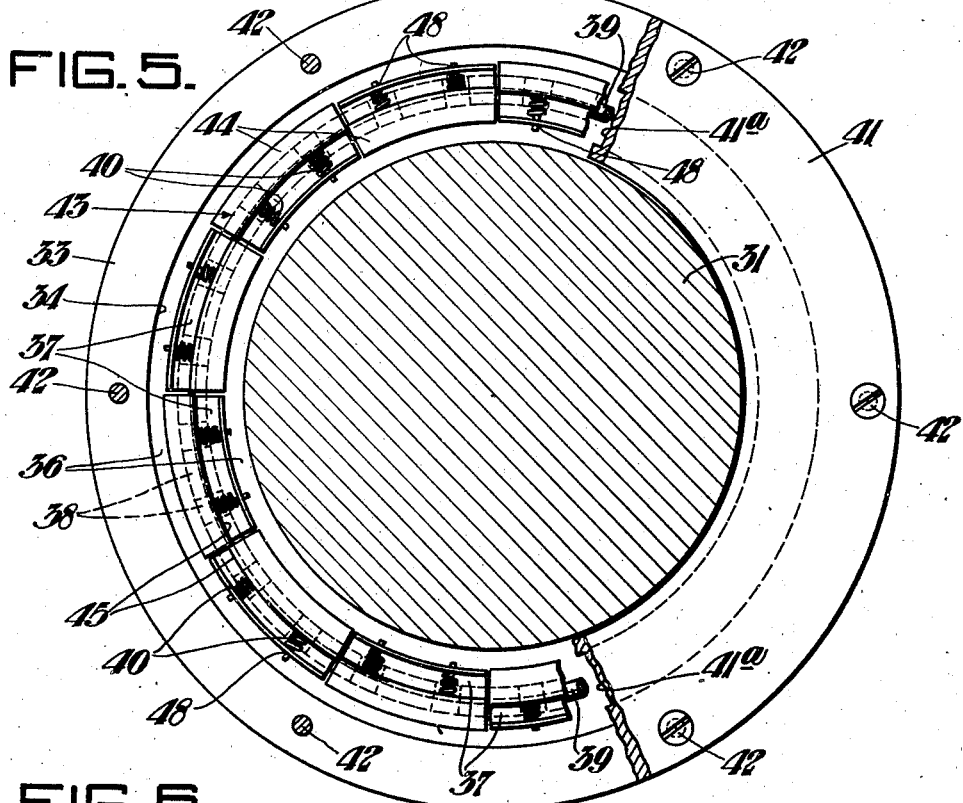
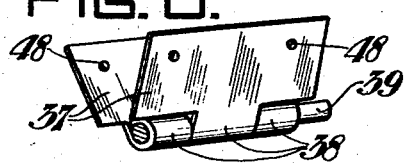
INVENTOR:
SAMUEL S. ROBERTS,
BY: John E. Jackson
HIS ATTORNEY.

Patented May 28, 1946

2,401,108

UNITED STATES PATENT OFFICE 2,401,108

SEAL FOR SHAFTS

Samuel S. Roberts, Pittsburgh, Pa.

Application May 29, 1942, Serial No. 445,063

5 Claims. (Cl. 286—26)

This invention is a seal for a shaft projecting through a hole in a housing, and is of the split type permitting its installation or removal without withdrawal of the shaft from the hole through which it projects.

Specific examples of the invention are illustrated by the accompanying drawings, in which:

Fig. 1 is a multiple-plane sectional view;

Fig. 2 is a partly sectional end view;

Fig. 3 is a fragmentary view, partly in section and illustrating a detail;

Fig. 4 is a multiple-plane section of another example of the invention;

Fig. 5 is a partly sectioned end view of this second example; and,

Fig. 6 is a detail from Figs. 4 and 5.

More specifically, these drawings show a rotary shaft 1 projecting through a hole 2 in a housing 3 of which only a part is shown. This housing may be a bearing housing, gear-case housing, etc., the opening necessarily providing some clearance around the shaft 1, which, it is to be assumed, must be sealed against either the entrance or exit of fluid.

According to the invention, a gasket 4 is provided for application to the face of the housing 3 around the hole 2, this gasket providing an annular recessed seat 5 and having a beveled radial slit 6. A cylindrical casing sleeve 7 is adapted to fit into the seat 5, this sleeve being made of rigid material and being oppositely provided with stepped splits 8, which, in conjunction with screws 9, provide the sleeve with separable joints. It is to be understood that the gasket 4 is made of material that may be more easily elastically deformed, whereby it can properly perform its function.

A flexible axially facing channel ring 10 is constructed to fit between the sleeve 7 and the shaft 1, with its convex surface in contact with the gasket 4, this channel ring having radial flanges 11 oppositely projecting from its edges so that when the channel ring is in the assembly under description, its inner flange bears on the shaft 1, this flange having a tapered edge and functioning as a seal against the shaft 1, while its outer flange overlies the outer end of the sleeve 7.

A flexible tube 12 has a diagonal closed end 13 and an open end 14 provided with an air-check valve 15. This tube is made sufficiently long so that it can be looped completely around inside the channel ring 10, with its open end overlapping its diagonally closed end to a sufficient extent to render this open end easily accessible, the diagonally closed end 13 being arranged so that it and the overlapping open end fit neatly. As shown by the drawings, the tube 12 has a flattened rectangular contour, the channel ring 10 being internally shaped to receive the tube so that the latter's longer diameter is arranged in a cylindrical plane. Both the tube and channel ring are made of a material having the general characteristics of rubber; for instance, an oil-proof synthetic rubber. It follows, that by introducing fluid under pressure, such as air from a small hand pump, to the tube 12 by way of its open end 14 through its check valve 15, the flat side walls of this tube may be expanded to force the inner flange 11 of the channel ring 10 against the shaft 1.

To complete the assembly and maintain the tube 12 and the ring 11 in their proper positions, a flat ring cover plate 16 is provided, this plate having an outer depending flange 17, which encompasses the outer edge of the outer flange 11 of the channel ring 10, and the upper portion of the sleeve 7. The inside of this ring cover plate engages the outer flange of the channel ring 10 and the tube 12, the cover plate having a circumferential recess fitting the tube and an opening 18 through which the overlapping end of this tube projects so as to place it in an accessible position. The cover plate 16 is clamped by a plurality of cap screws 19 screwed into threaded holes formed in the outside of the housing 3, the inside of the cover plate 16 then firmly clamping the outer flange of the channel ring 10 to the top edge of the sleeve 7, while clamping the sleeve 7 down into the seat 5 in the gasket 4, the tube 12 being likewise positioned and the convex surface of the channel ring 10 being also forced down against the gasket 4. The inner periphery of the cover plate 16 is recessed, as at 20, to permit the inner one of the flanges 11 of the channel ring 10 to be freely flexible, the edge of this flange functioning as a seal. The cover plate 16 is oppositely provided with stepped radial splits 21 which, in conjunction with screws 22, provide the cover plate with separable joints.

It has been mentioned that in the case of each of the various parts that encircle the shaft 1, radial splits are provided so that the entire seal may be applied without disassembling the shaft 1 respecting the housing 3. The channel ring is mainly responsible for making the seal fluid tight, and if it were provided with an ordinary split, it might tend to leak. With this in mind, this channel ring is made of a plurality of laminations 10a and 10b, which are each provided with diagonal splits 10c and 10d, respectively, and inter-related so that these splits are respectively offset, preferably 180° apart. Therefore, when assembled, the arrangement is fluid tight.

It can now be appreciated that, although the seal disclosed is of the split type and enjoys the advantages incidental to this type, it is a self-contained unit of universal usefulness. It is unnecessary to machine the outside of the housing 3, nor need this housing be provided with a counterbore, although the seal may be used if a counterbore is provided. Sharp edges or burrs on the edge of the shafting or the hole in the housing, through which the shaft projects, do not interfere with the installation of the seal. Since the pressure the sealing element applies the shaft is regulated by the air pressure, or other fluid pressure, pumped into the tube 12 by way of the valve 15, the sealing pressure may be externally varied as desired without disassembling the seal.

To install the seal to an arrangement such as the housing 3 and shaft 1 illustrated, when the housing 3 is provided with no facilities for this purpose, holes are drilled and capped in the outer face of the housing 3 for the cap screws 19, the cover plate being used as a template for this purpose. The seal's five component parts are then individually slipped over the shaft and assembled, then moved together to the housing 3 and the cap screws 19 then applied to complete the assembly. When these cap screws are tightened, all parts of the seal are firmly locked together, the channel ring 10, which, through the inner one of its flanges 11, seals against shaft 1, being positively fixed against rotating with the shaft.

Upon assembling, a small hand air pump may be used to pump air through the valve 15 into the tube 12, the pressure applied being regulated as required to effect proper sealing. Since the channel ring 10 is of laminated construction, the inner edges of its flange laminations provide lips bearing against the shaft 1, which are capable of working freely, yet applying firm pressure.

In the case of the other example, a rotary shaft 31 projects through a hole 32 in a housing 33 of which only a part is shown. Here again, the housing may be a bearing housing, a gear case housing, etc., the hole 32 necessarily providing some clearance around the shaft, which must be sealed against either the entrance or exit of fluid or other material. The arrangement differs from that of the first example in that the housing 33 provides a recess 34 surrounding the opening to the hole 32, and, of course, shaft 31. This recess 34 may be provided by an external part applied to the outer face of the housing 33, in the event it cannot be made in the housing itself.

A flexible axially facing channel ring 35 is constructed to fit in the recess 34 so as to surround the shaft 31, with its convex surface, or back, in contact with the bottom of the recess. This ring has radial webs 36 oppositely projecting from its flange edges, the edges of the inner one of these flanges bearing against the shaft 31, and the edges of the outer one bearing against the side wall of the recess 34. This channel ring is otherwise made like the ring 10 of the first example.

In the case of this second example, the means for elastically expanding the flanges of the channel ring, are mechanical in nature. This means consists of an annular series of radially opposed plates 37 having cooperating hinge portions 38 working on a hinge ring 39, whereby the plates are hinged in circumferential alignment to radially swing oppositely. Compression springs 40 are interposed between the plates which are positioned inside the channel ring 35 with their hinged portions 38 toward the bottom of the channel ring 35, and with their swinging portions radially expanding the flanges of this channel ring, this being effected through the action of the compression springs 40. The annular series of hinged plates is positioned in this manner, by a flat ring 41 held by screws 42 engaging the outer face of the housing 33. The expanding force applied the channel ring flanges may be varied by adjustment of these screws, this forcing the hinged plates more or less into the channel ring so as to vary the compression on the springs 40.

To positively position the annular series of hinged plates, an anchorage ring 43 is provided, this providing radial webs 44 which fit in an annular recess 41a formed in the bottom of the ring 41, and flanges 45 having transverse holes 46 through which the compression springs pass, and circumferentially directed openings 47 through which the hinge ring 39 passes. The opposed plates 37 have holes 48, and the ends of the springs 40 are straightened axially so as to extend through these holes 48, this, in conjunction with the holes 46 in the web 45, serving to positively position the various springs.

To permit installation of the complete seal as described in connection with the first example, the ring 41 is split into two sections which are screwed together after being placed about the shaft 31. The channel ring 35 is made in two superimposed sections that are oppositely split as described in connection with the first example, and the hinge ring 39 is split so that the annular series of plates may be placed around the shaft and then assembled in annular form. For similar reasons, the anchorage ring 43 is oppositely split, this ring being held together after assembly about the shaft 31 by the recess 45 in the ring 41.

I claim:

1. A seal for a shaft projecting through a hole in a housing, comprising a flexible axially facing channel ring with radial webs projecting oppositely from its flange edges and which is adapted to encircle the shaft with its inner flange edge sealing thereagainst, a flexible tube adapted to fit annularly in said channel ring and receive fluid under pressure to cause its expansion, means for rigidly clamping the outer flange of said ring to position it respecting the housing, and means for holding said tube in said channel ring.

2. A seal for a shaft projecting through a hole in a housing, comprising a flexible axially facing channel ring with radial webs projecting oppositely from its flange edges and which is adapted to encircle the shaft with its inner flange edge sealing thereagainst, a flexible tube adapted to fit annularly in said channel ring and receive fluid under pressure to cause its expansion, means for rigidly clamping the outer flange of said ring to position it respecting the housing, and means for holding said tube in said channel ring, the latter being made of a plurality of laminations that are each radially split at respectively offset locations.

3. A seal for a shaft projecting through a hole in a housing, comprising a flexible axially facing channel ring with radial webs projecting oppositely from its flange edges and which is adapted to encircle the shaft with its inner flange edge sealing thereagainst, a flexible tube adapted to fit annularly in said channel ring and receive fluid under pressure to cause its expansion, means for rigidly clamping the outer flange of said ring to position it respecting the housing, and means for holding said tube in said channel ring, the latter being made of a plurality of laminations that are each radially split at respectively offset locations, and said tube having one end closed with its other end open for receiving the fluid under pressure and being sufficiently long to be looped into said channel ring with its open end accessible.

4. A seal for a shaft projecting through a hole in a housing, comprising a gasket for application to the face of said housing around said hole and providing an annular recessed seat, a cylindrical casing sleeve fitting into said seat, a flexible axially facing channel ring fitting face outwardly between said shaft and said sleeve with radial flanges oppositely projecting from its edges so the inner flange bears on said shaft and the outer flange overlies the outer end of said sleeve, a flexible tube having a closed end with an open end for receiving fluid under pressure and which is sufficiently long to be looped completely around in said channel ring with its open end overlapping outwardly, a flat ring cover plate for engaging and covering said outer flange of said channel ring and said tube while clearing said inner flange of said channel ring and having an opening through which said open end of said tube may project, and means for clamping said plate to said housing.

5. A seal for a shaft projecting through a hole in a housing, comprising a gasket for application to the face of said housing around said hole and providing an annular recessed seat, a cylindrical casing sleeve fitting into said seat, a flexible axially facing channel ring fitting face outwardly between said shaft and said sleeve with radial flanges oppositely projecting from its edges so the inner flange bears on said shaft and the outer flange overlies the outer end of said sleeve, a flexible tube having a closed end with an open end for receiving fluid under pressure and which is sufficiently long to be looped completely around in said channel ring with its open end overlapping outwardly, a flat ring cover plate for engaging and covering said outer flange of said channel ring and said tube while clearing said inner flange of said channel ring and having an opening through which said open end of said tube may project, and means for clamping said plate to said housing, said gasket, said sleeve, and said cover plate being radially split, and said channel ring being made of laminations that are radially split in respectively offset relations.

SAMUEL S. ROBERTS.